(12) United States Patent
Huang et al.

(10) Patent No.: US 11,100,304 B2
(45) Date of Patent: Aug. 24, 2021

(54) DISPLAY PANEL, DRIVING METHOD, AND DISPLAY DEVICE

(71) Applicant: Xiamen Tianma Micro-Electronics Co., Ltd., Xiamen (CN)

(72) Inventors: Min Huang, Xiamen (CN); Ying Sun, Xiamen (CN); Yumin Xu, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 15/930,997

(22) Filed: May 13, 2020

(65) Prior Publication Data

US 2021/0200973 A1 Jul. 1, 2021

(30) Foreign Application Priority Data

Dec. 27, 2019 (CN) .......................... 201911373481.X

(51) Int. Cl.
*G06K 9/00* (2006.01)
*G06F 3/041* (2006.01)
*G06F 3/044* (2006.01)

(52) U.S. Cl.
CPC ......... *G06K 9/0002* (2013.01); *G06F 3/0412* (2013.01); *G06F 3/0446* (2019.05); *G06F 3/04144* (2019.05); *G06K 9/0004* (2013.01)

(58) Field of Classification Search
None
See application file for complete search history.

(56) References Cited

U.S. PATENT DOCUMENTS

| 2016/0055813 | A1* | 2/2016 | Lee ...................... G09G 3/3655 |
| | | | 345/691 |
| 2020/0225806 | A1* | 7/2020 | Ding ..................... G06F 3/0421 |
| 2020/0264728 | A1* | 8/2020 | Qin ................... H01L 27/14683 |
| 2020/0321387 | A1* | 10/2020 | Jang ................. H01L 27/14612 |

FOREIGN PATENT DOCUMENTS

| CN | 106775109 A | 5/2017 |
| CN | 110032303 A | 7/2019 |

\* cited by examiner

*Primary Examiner* — Joseph R Haley
(74) *Attorney, Agent, or Firm* — Anova Law Group, PLLC

(57) ABSTRACT

Display panel, driving method, and display device are provided. The display panel includes first signal output lines, first signal input lines, fingerprint recognition units arranged in an array, touch-control electrodes arranged in an array, and a driving circuit. One touch-control electrode corresponds to at least two fingerprint recognition units, and is electrically connected to at least one first signal input line. One fingerprint recognition unit includes a photodiode, a first electrode, and a switch module. A first terminal of the photodiode is electrically connected to the switch module, a second terminal of the photodiode is electrically connected to a corresponding touch-control electrode, the switch module is electrically connected to a corresponding first signal output line, and the first electrode is electrically connected to the first terminal of the photodiode. The first signal output lines and the first signal input lines are electrically connected to the driving circuit.

20 Claims, 12 Drawing Sheets

US 11,100,304 B2

DISPLAY PANEL, DRIVING METHOD, AND DISPLAY DEVICE

CROSS-REFERENCES TO RELATED APPLICATION

This application claims the priority of Chinese Patent Application No. 201911373481.X, filed on Dec. 27, 2019, the content of which is incorporated herein by reference in its entirety.

TECHNICAL FIELD

The present disclosure generally relates to the field of display technology and, more particularly, relates to a display panel, a driving method, and a display device.

BACKGROUND

Fingerprints are inherent to everyone. With the development of technology, a variety of display devices with fingerprint recognition functions have appeared on the market, such as mobile phones, tablet computers, and smart wearable devices. Before operating a display device with fingerprint recognition function, users only need to touch the display device with their fingers to perform permission identification, which simplifies the authorization identification process. As application scenarios of fingerprint recognition function increase, the fingerprint recognition area gradually changes from a part of the area to full-screen identification.

In an existing display device based on optical fingerprint recognition technology, a light-sensitive fingerprint sensor is formed based on a semiconductor device, and fingerprint detection is achieved by utilizing a characteristic that a semiconductor device will leak when it is irradiated by light. Specifically, light generated by a fingerprint recognition light source is reflected at a surface of a display device touched by a finger. A reflected light irradiates the fingerprint recognition sensor. The light-sensitive fingerprint sensor detects the intensity of the light caused by the fluctuation of valleys and peaks of the fingerprint, thereby generating a fingerprint spectrum. However, an existing photoelectric detection unit includes a selection switch and a light-sensitive fingerprint sensor, called a passive detection circuit. Although its structure is simple, its ability to resist noise interference is poor. Especially after the photoelectric detection unit is integrated into the display panel, the input noise of a driving circuit is larger because of problems such as length of lines and crosstalk between lines, affecting the accuracy of fingerprint recognition. In addition, integration of the photoelectric detection unit in the display panel will increase the number of pins of the driving chip, which is not good for the narrow border of the display panel.

The disclosed display panel, driving method and display device are directed to solve one or more problems set forth above and other problems.

SUMMARY

One aspect of the present disclosure provides a display panel. The display panel includes a plurality of first signal output lines, a plurality of first signal input lines, a plurality of fingerprint recognition units arranged in an array, a plurality of touch-control electrodes arranged in an array, and a driving circuit. One touch-control electrode of the plurality of touch-control electrodes at least corresponds to two fingerprint recognition units of the plurality of fingerprint recognition units, and is electrically connected to at least one of the plurality of first signal input lines. A fingerprint recognition unit of the plurality of fingerprint recognition units includes a photodiode, a first electrode, and a switch module. For the fingerprint recognition unit, a first terminal of the photodiode is electrically connected to the switch module, a second terminal of the photodiode is electrically connected to a corresponding one of the plurality of touch-control electrodes, the switch module is electrically connected to a corresponding one of the plurality of first signal output lines, and the first electrode is electrically connected to the first terminal of the photodiode. The plurality of first signal output lines and the plurality of first signal input lines are electrically connected to the driving circuit.

Another aspect of the present disclosure provides a driving method for a display panel. The display panel includes a plurality of first signal output lines, a plurality of first signal input lines, a plurality of fingerprint recognition units arranged in an array, a plurality of touch-control electrodes arranged in an array, and a driving circuit. One touch-control electrode of the plurality of touch-control electrodes corresponds to at least two fingerprint recognition units of the plurality of fingerprint recognition units, and is electrically connected to at least one of the plurality of first signal input lines. A fingerprint recognition unit of the plurality of fingerprint recognition units includes a photodiode, a first electrode, and a switch module. For the fingerprint recognition unit, a first terminal of the photodiode is electrically connected to the switch module, a second terminal of the photodiode is electrically connected to a corresponding one of the plurality of touch-control electrodes, the switch module is electrically connected to a corresponding one of the plurality of first signal output lines, and the first electrode is electrically connected to the first terminal of the photodiode. The plurality of first signal output lines and the plurality of first signal input lines are electrically connected to the driving circuit. The driving method includes: in a touch-control stage, the driving circuit controlling the plurality of first signal input lines to input touch-control driving signals, and controlling the plurality of first signal output lines to output touch-control position information; and in a fingerprint recognition stage, the driving circuit controlling the plurality of first signal input lines to input bias voltage signals, and controlling the plurality of first signal output lines to output fingerprint information.

Another aspect of the present disclosure provides a display device. The display device includes a display panel. The display panel includes a plurality of first signal output lines, a plurality of first signal input lines, a plurality of fingerprint recognition units arranged in an array, a plurality of touch-control electrodes arranged in an array, and a driving circuit. One touch-control electrode of the plurality of touch-control electrodes corresponds to at least two fingerprint recognition units of the plurality of fingerprint recognition units, and is electrically connected to at least one of the plurality of first signal input lines. A fingerprint recognition unit of the plurality of fingerprint recognition units includes a photodiode, a first electrode, and a switch module. For the fingerprint recognition unit, a first terminal of the photodiode is electrically connected to the switch module, a second terminal of the photodiode is electrically connected to a corresponding one of the plurality of touch-control electrodes, the switch module is electrically connected to a corresponding one of the plurality of first signal output lines, and the first electrode is electrically connected to the first terminal of the photodiode. The plurality of first signal output lines and the plurality of first signal input lines are electrically connected to the driving circuit.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
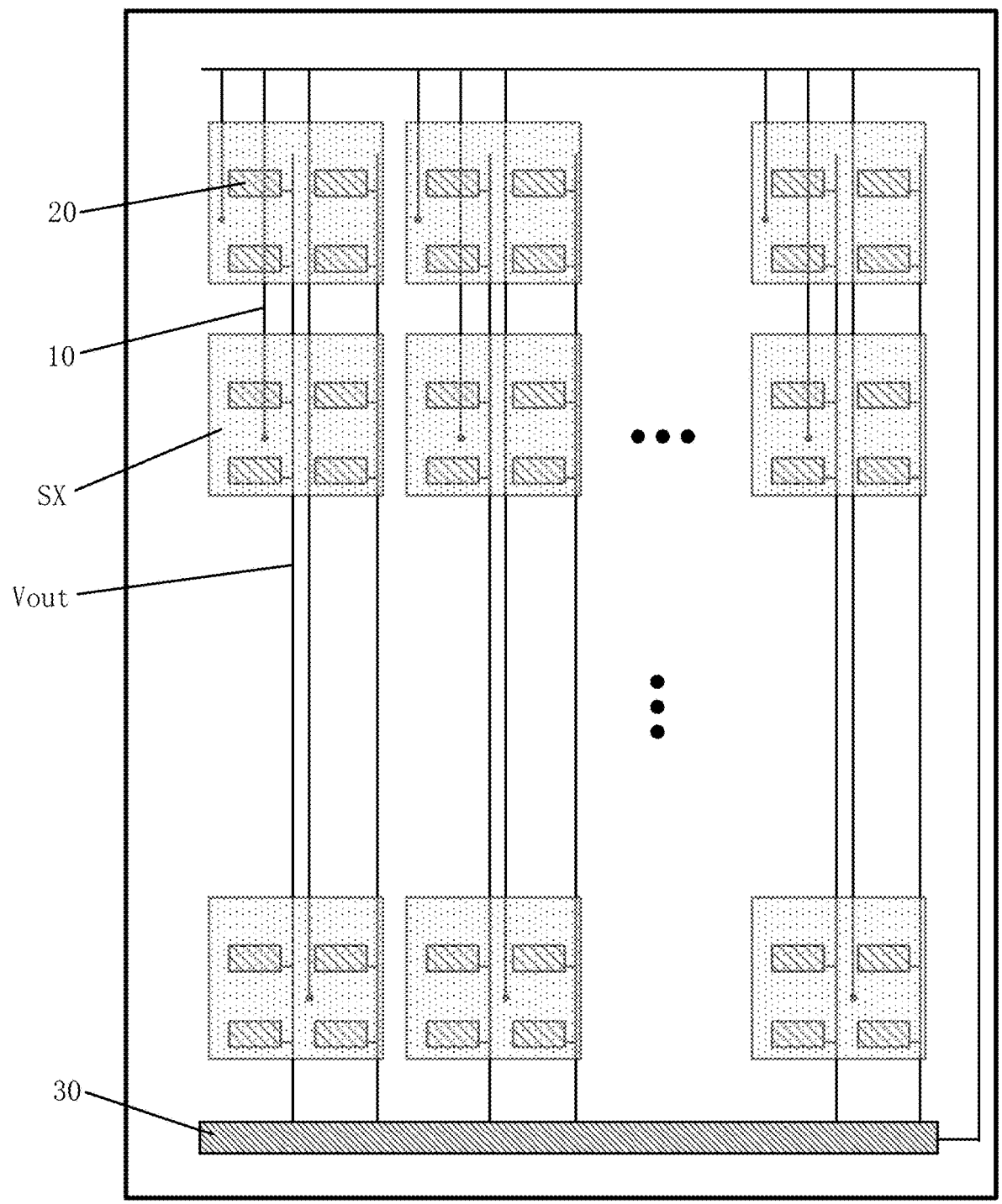
FIG. 1 illustrates an exemplary display panel consistent with various disclosed embodiments in the present disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the disclosure. Furthermore, a three-dimensional (3D) size including length, width and depth should be considered during practical fabrication.

Figure 2:
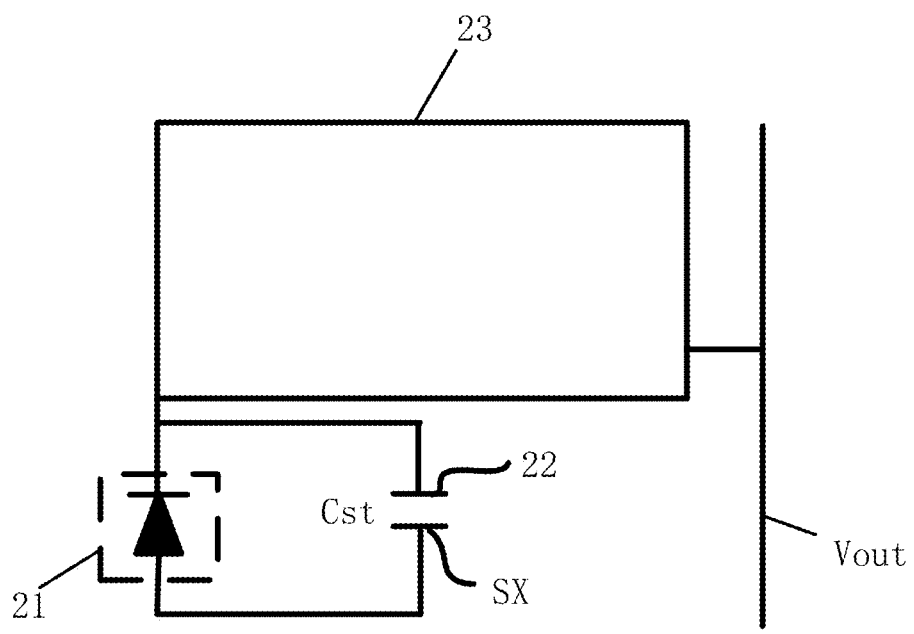
FIG. 2 illustrates an equivalent circuit of an exemplary fingerprint recognition unit consistent with various disclosed embodiments in the present disclosure.

The present disclosure provides a display panel. FIG. 1 illustrates an exemplary display panel and FIG. 2 illustrates an equivalent circuit of an exemplary fingerprint recognition unit, consistent with various disclosed embodiments in the present disclosure. As illustrated in FIGS. 1-2, the display panel may include a plurality of first signal output lines Vout, a plurality of first signal input lines 10, a plurality of fingerprint recognition units 20 arranged in an array, a plurality of touch-control electrodes SX arranged in an array, and a driving circuit 30. Each of the plurality of touch-control electrodes SX may correspond to at least two of the plurality of fingerprint recognition units 20.

Each of the plurality of touch-control electrodes SX may be electrically connected to at least one of the plurality of first signal input lines 10.

Each fingerprint recognition unit 20 of the plurality of fingerprint recognition units 20 may include a photodiode 21, a first electrode 22, and a switch module 23. In the fingerprint recognition unit 20, a first terminal of the photodiode 21 may be electrically connected to the switch module 23, and a second terminal of the photodiode 21 may be electrically connected to a corresponding one of the plurality of touch-control electrodes SX. The switch module 23 may be electrically connected to a corresponding one of the plurality of first signal output lines Vout. The first electrode 22 may be electrically connected to the first terminal of the photodiode 21.

The plurality of first signal output lines Vout and the plurality of first signal input line 10 may be electrically connected to the driving circuit 30.

In the present embodiment, the display panel may include the plurality of fingerprint recognition units 20 arranged in an array and the plurality of touch-control electrodes SX arranged in an array. Each of the plurality of touch-control electrodes SX may correspond to at least two of the plurality of fingerprint recognition units 20. Each of the plurality of touch-control electrodes SX may be electrically connected to a corresponding one of the plurality of first signal input lines 10. Each fingerprint recognition unit 20 of the plurality of fingerprint recognition units 20 may include the photodiode 21, the first electrode 22, and the switch module 23. The first terminal of the photodiode 21 may be electrically connected to the switch module 23, and the second terminal of the photodiode 21 may be electrically connected to a corresponding one of the plurality of touch-control electrodes SX. Each switch module 23 may be electrically connected to a corresponding one of the plurality of first signal output lines Vout. The first electrode 22 may be electrically connected to the first terminal of the photodiode 21. In each of the plurality of fingerprint recognition units 20, the first electrode 22 and the corresponding one of the plurality of touch-control electrodes SX may form a memory capacitance Cst illustrated in FIG. 2. A first electrode of the memory capacitance Cst electrically connected to the photodiode 21 may be the first electrode 22, and the corresponding one of the plurality of touch-control electrode SX may be multiplexed as another electrode of the memory capacitance.

The plurality of first signal output lines Vout and the plurality of first signal input line 10 may be electrically connected to the driving circuit 30. In a touch-control stage, the driving circuit 30 may control the plurality of first signal input lines 10 to input touch-control signals. In each of the plurality of fingerprint recognition units, a voltage of the second terminal of the photodiode 21 may be a voltage of the touch-control signals. When a finger touches the display panel, the light may be reflected when arriving at the fingerprint of the finger and the reflective light may project at the photodiode 21 to induce a change of resistance of the photodiode 21. Correspondingly, charges may be generated to form a photoinductive current, and the photoinductive current may pass through the switch module 23 to generate a voltage signal. When no finger touches the display panel, the light may not be reflected to the photodiode 21. For one fingerprint recognition unit 20 of the plurality of fingerprint recognition units, a corresponding first signal output line Vout of the plurality of first signal output lines electrically connected to the fingerprint recognition unit 20 may output different voltage signals when the fingerprint recognition unit 20 is or is not in contact with the finger. Correspondingly, according to variation of the output voltage signal in one first signal output line Vout of the plurality of first signal output lines, it can be determined whether a fingerprint recognition unit 20 of the plurality of fingerprint recognition units electrically connected to the first signal output line is touched. A corresponding touch-control position may be obtained and the plurality of first signal output lines Vout may output touch position information.

In a fingerprint recognition stage, the driving circuit 30 may control the plurality of first signal input lines 10 to input a bias voltage signal. When a finger touches the screen, the light may be reflected when it strikes valley lines and ridge lines of a fingerprint of the finger. Because of different reflection angles and different intensity of the reflected light for the valley lines and ridge lines, the light may be projected onto photodiodes 21 of the plurality of fingerprint recognition units 20, causing a change of the resistance of the photodiodes 21. Correspondingly, charges may be generated to form photoinductive currents. The photoinductive currents may pass through switch modules 23 of the plurality of fingerprint recognition units and generate voltage signals. At this time, the plurality of first signal output lines Vout may output fingerprint information.

Figure 3:
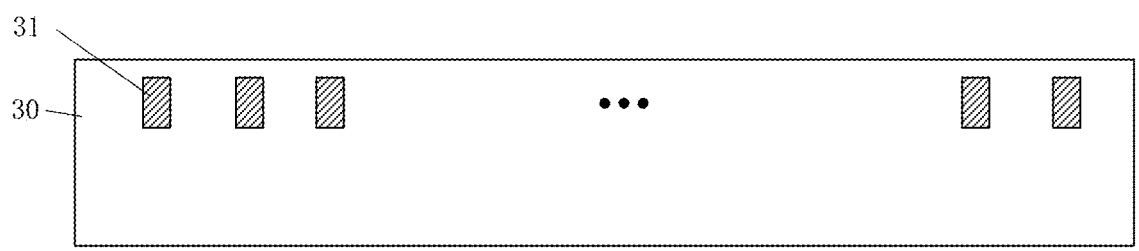
FIG. 3 illustrates an exemplary driving circuit consistent with various disclosed embodiments in the present disclosure.

Each of the plurality of touch-control electrodes SX and corresponding one of the plurality of fingerprint recognition units 20 may share a same first signal input line 10 and a same first signal output line Vout. A number of lines in the display panel, difficulty of wiring in the display panel, and crosstalk between lines may be effectively reduced. A signal-to-noise ratio of each of the plurality of fingerprint recognition units may be improved. Further, a number of lines electrically connected to the driving circuit 30 may be effectively reduced. FIG. 3 shows a schematic structural diagram of a driving circuit provided by the present disclosure. The driving circuit 30 may be electrically connected to lines through terminals 31. When the number of lines is reduced, a number of terminals 31 in the driving circuit 30 may also be reduced, facilitating a reduction of the design area of the driving circuit 30 and achieving a narrower frame of the display panel.

For description purposes only, the embodiment in FIG. 1 where each of the plurality of touch-control electrodes SX corresponds to four of the plurality of fingerprint recognition units 20 is used as an example to illustrate the present disclosure, and should not limit the scopes of the present disclosure. In various embodiments of the present disclosure, each of the plurality of touch-control electrodes SX may corresponds to any suitable number of fingerprint recognition units 20 of the plurality of fingerprint recognition units 20.

As illustrated in FIG. 1 and FIG. 3, in one embodiment, for each of the plurality of first signal input lines, one end may be electrically connected to the driving circuit 30 and another end may be electrically connected to a corresponding touch-control electrode SX of the plurality of touch-control electrodes through a corresponding through hole.

In the present disclosure, for one first signal input line 10 of the plurality of first signal input lines, one end may be electrically connected to the driving circuit 30 and another end may be electrically connected to a corresponding touch-control electrode SX of the plurality of touch-control electrodes through a corresponding through hole. In the touch-control stage, the driving circuit 30 may control the plurality of first signal input lines 10 to input the touch-control driving signal, and control the plurality of first signal output lines Vout to output the touch-control position information. In the fingerprint recognition stage, the driving circuit 30 may control the plurality of first signal input lines 10 to input the bias voltage signal, and control the plurality of first signal output lines Vout to output the fingerprint information. There may be no need to electrically connect two ends of each of the plurality of first signal input lines 10 to the driving circuit 30. The length of each of the plurality of first signal input lines 10 may be reduced effectively, and interference of the plurality of first signal input lines 10 to the plurality of first signal output lines Vout may be alleviated. The signal-to-noise ratio of the plurality of fingerprint recognition units 20 may be improved. Also, the number of terminals 31 in the driving circuit 30 may be reduced, facilitating a reduction of the design area of the driving circuit 30 and achieving a narrower frame of the display panel further.

For description purposes only, the embodiment in FIG. 1 where each of the plurality of touch-control electrodes SX is connected to one of the plurality of first signal input lines 10 is used as an example to illustrate the present disclosure, and should not limit the scopes of the present disclosure. In various embodiments of the present disclosure, each of the plurality of touch-control electrodes SX may correspond to any suitable number of first signal input lines the plurality of first signal input lines 10.

Figure 4:
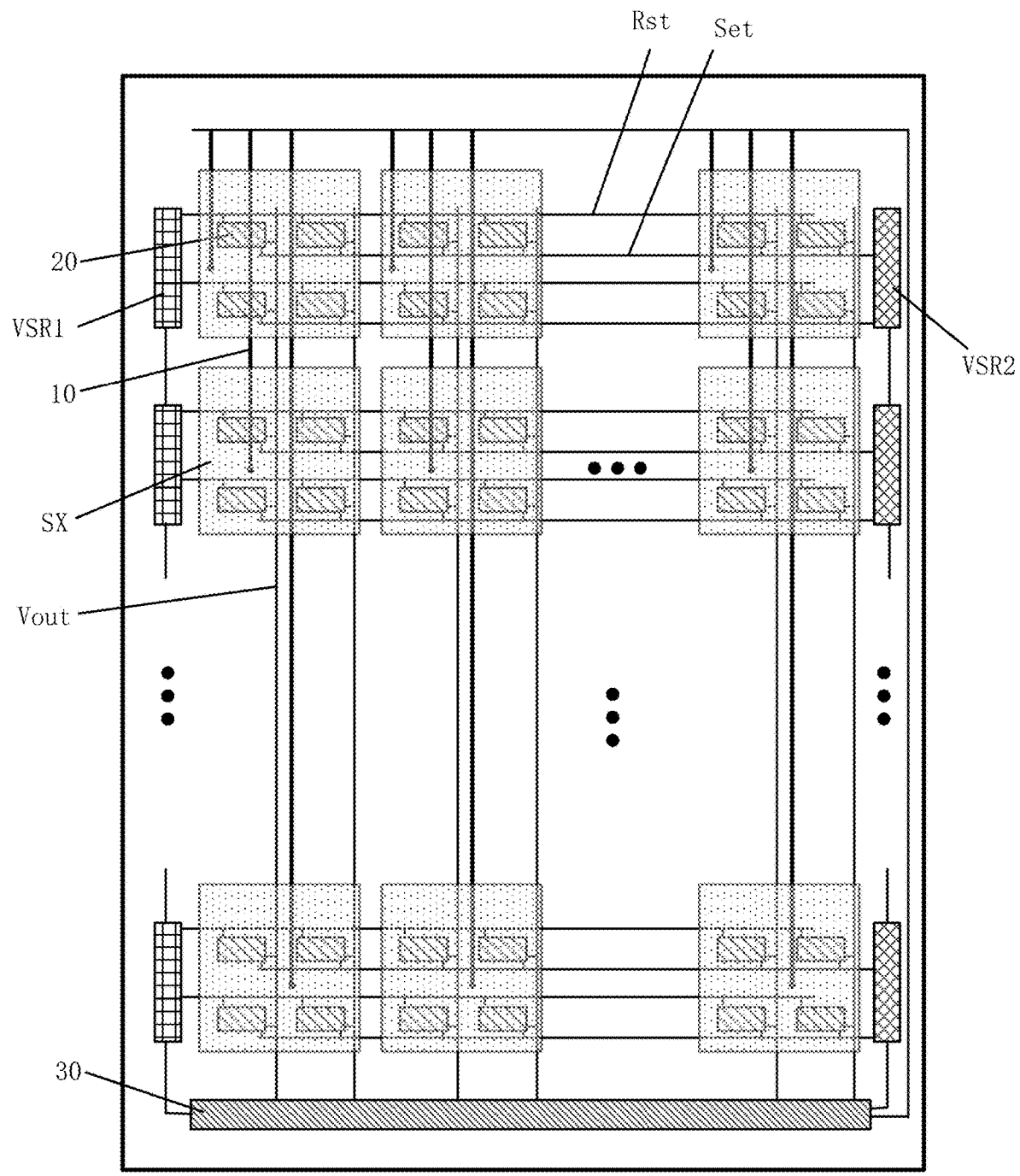
FIG. 4 illustrates another exemplary display panel consistent with various disclosed embodiments in the present disclosure.

The present disclosure also provides another display panel illustrated in FIG. 4. As illustrated in FIG. 4, the display panel may further include a plurality of first control signal lines Rst, a plurality of second control signal lines Set, a plurality of first gate driving circuits VSR1, and a plurality of second gate driving circuits VSR2.

The plurality of first gate driving circuits VSR1 and the plurality of second gate driving circuits VSR2 may be electrically connected to the driving circuit 30.

Fingerprint recognition units 20 of the plurality of fingerprint recognition units connected to a same one of the plurality of touch-control electrodes SX may be connected to a same first gate driving circuit of the plurality of first gate driving circuits VSR1 through the plurality of first control signal lines Rst.

Fingerprint recognition units 20 of the plurality of fingerprint recognition units connected to a same touch-control electrode of the plurality of touch-control electrodes SX may be connected to a same second gate driving circuit of the plurality of second gate driving circuits VSR2 through the plurality of second control signal lines Set.

In the present disclosure, the display panel may further include the plurality of first gate driving circuits VSR1 and the plurality of second gate driving circuits VSR2 electrically connected to the driving circuit 30. Fingerprint recognition units 20 of the plurality of fingerprint recognition units connected to a same touch-control electrode of the plurality of touch-control electrodes SX may be connected to a same first gate driving circuit of the plurality of first gate driving circuits VSR1 through the plurality of first control signal lines Rst. Fingerprint recognition units 20 of the plurality of fingerprint recognition units connected to a same touch-control electrode of the plurality of touch-control electrodes SX may be connected to a same second gate driving circuit of the plurality of second gate driving circuits VSR2 through the plurality of second control signal lines Set. In the touch-control stage, the driving circuit 30 may determine touch-control area based on the touch-control position information. In the fingerprint recognition phase, based on the touch-control area the driving circuit 30 may provide driving signals to a portion of the plurality of first gate driving circuits VSR1 and a portion of the plurality of second gate driving circuits VSR2 electrically connected to a portion of the plurality of fingerprint recognition units 20 located in the touch-control area. The portion of the plurality of first gate driving circuit VSR1 and the portion of the plurality of second gate driving circuit VSR2 may provide driving signals to the portion of the plurality of fingerprint recognition units 20 in the touch-control area. It may not be necessary to drive all of the plurality of first gate driving circuits VSR1 and all of the plurality of second gate driving circuits VSR2 in the fingerprint recognition state to provide the driving signals to all of the plurality of the fingerprint recognition units 20. The driving capability of the display panel may be improved, and the power consumption may be reduced.

Figure 5:
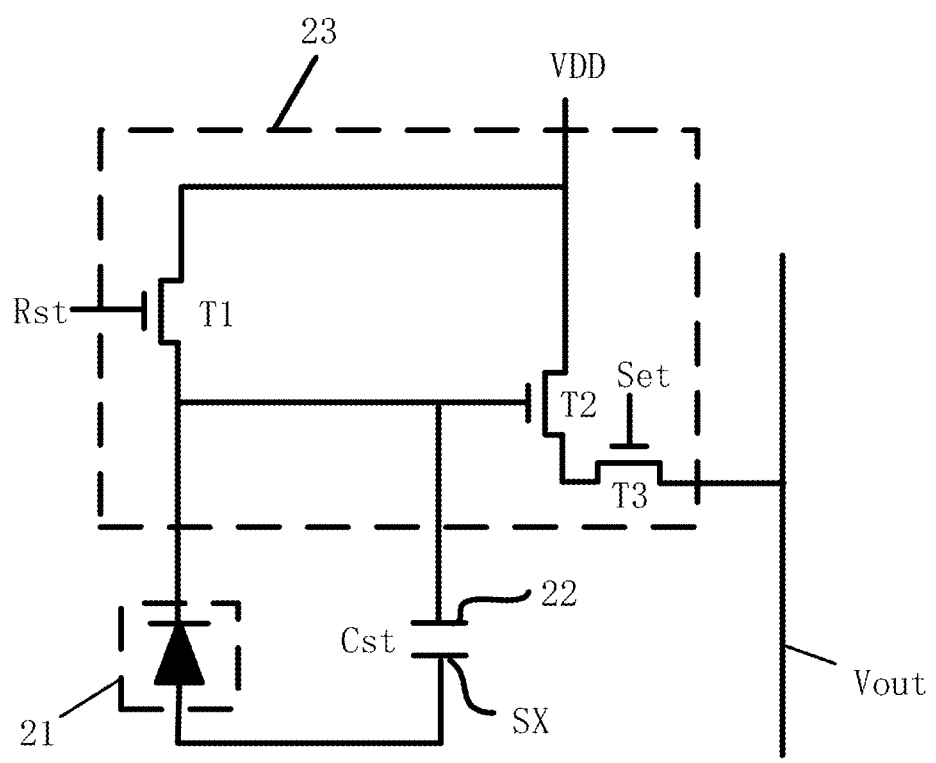
FIG. 5 illustrates another equivalent circuit of an exemplary fingerprint recognition unit consistent with various disclosed embodiments in the present disclosure.

The present disclosure also provides another fingerprint recognition unit. As illustrated in FIGS. 4-5, for each fingerprint recognition unit 20 of the plurality of fingerprint recognition units, the switch module 23 may include a first transistor T1, a second transistor T2, and a third transistor T3.

For the first transistor T1, a gate may be electrically connected to a corresponding first control signal line Rst, a first terminal may be electrically connected to the first terminal of the photodiode 21, and a second terminal may be electrically connected to a first voltage signal terminal VDD.

For the second transistor T2, a gate may be electrically connected to the first electrode of the photodiode 21, a first terminal may be electrically connected to a first terminal of the third transistor T3, and a second terminal may be electrically connected to a first voltage signal terminal VDD.

For the third transistor T3, a gate may be electrically connected to a corresponding second control signal line Set, and a second terminal may be electrically connected to a corresponding first signal output line Vout.

As illustrated in FIGS. 4-5, the touch-control stage may include a first reset stage and a first electrical signal output stage.

In the first reset stage, first transistors T1 of the plurality of fingerprint recognition units 20 may be turned on in response to the control signal from the plurality of first control signal lines Rst, to reset the plurality of fingerprint recognition units 20.

In the first electrical signal output stage, the first transistors T1 of the plurality of fingerprint recognition units 20 may be turned off in response to the control signal from the plurality of first control signal lines Rst and third transistors T3 of the plurality of fingerprint recognition units 20 may be turned on in response to the control signal from the plurality of second control signal lines Set. The driving circuit 30 may control the plurality of first signal input lines 10 to input the touch-control signal. In each of the plurality of fingerprint recognition units, a voltage of the second terminal of the photodiode 21 may be a voltage of the touch-control signal. When a finger touches the display panel, light may be reflected when the light arrives at the fingerprint of the finger and the reflective light may project at the photodiode 21 to induce a change of resistance of the photodiode 21. Correspondingly, charges may be generated to form a photoinductive current. The second transistor may be driven to conduct and the photoinductive current may pass through the second transistor T2 to generate a voltage signal. The voltage signal may be output by corresponding one of the plurality of first signal output lines Vout through the conducting third transistor T3.

The fingerprint recognition stage may include a second reset stage, an exposure stage, and a second electrical signal output stage.

In the second reset stage, the first transistors T1 of the plurality of fingerprint recognition units 20 may be turned on in response to the control signal from the plurality of first control signal lines Rst, to reset the plurality of fingerprint recognition units 20.

In the exposure stage, the first transistors T1 of the plurality of fingerprint recognition units 20 may be turned off in response to the control signal from the plurality of first control signal lines Rst and third transistors T3 of the plurality of fingerprint recognition units 20 may be turned off in response to the control signal from the plurality of second control signal lines Set. When a finger touches the screen, the light may be reflected when it strikes valley lines and ridge lines of a fingerprint of the finger. Because of different reflection angles and difference intensity of the reflected light for the valley lines and ridge lines, the light may be projected onto photodiodes 21 of the plurality of fingerprint recognition units 20, causing a change of the resistance of the photodiodes 21. Correspondingly, charges may be generated to form photoinductive currents.

In the second electrical signal output stage, the third transistors T3 of the plurality of fingerprint recognition units 20 may be turned on in response to the control signal from the plurality of second control signal lines Set. The driving circuit 30 may control the plurality of first signal input lines 10 to input the bias voltage signal to drive the second transistors T2 of the plurality of fingerprint recognition units to conduct. The photoinductive currents may pass through the second transistors of the plurality of fingerprint recognition units 20 and generate voltage signals. The voltage signal may be output by the plurality of first signal output lines Vout through the conducting third transistors T3.

The fingerprint recognition unit in the present embodiment may have a 3T1D structure. In comparison with a 1T1D circuit structure, the 3T1D structure may have a stronger anti-interference capability and the signal-to-noise ratio may be improved. For description purposes only, the fingerprint recognition unit with the 3T1D structure is used as an example to illustrate the present disclosure, and should not limit the scopes of the present disclosure. In various embodiments, the fingerprint recognition unit may use any suitable structure including a 4T1D structure.

Figure 6:
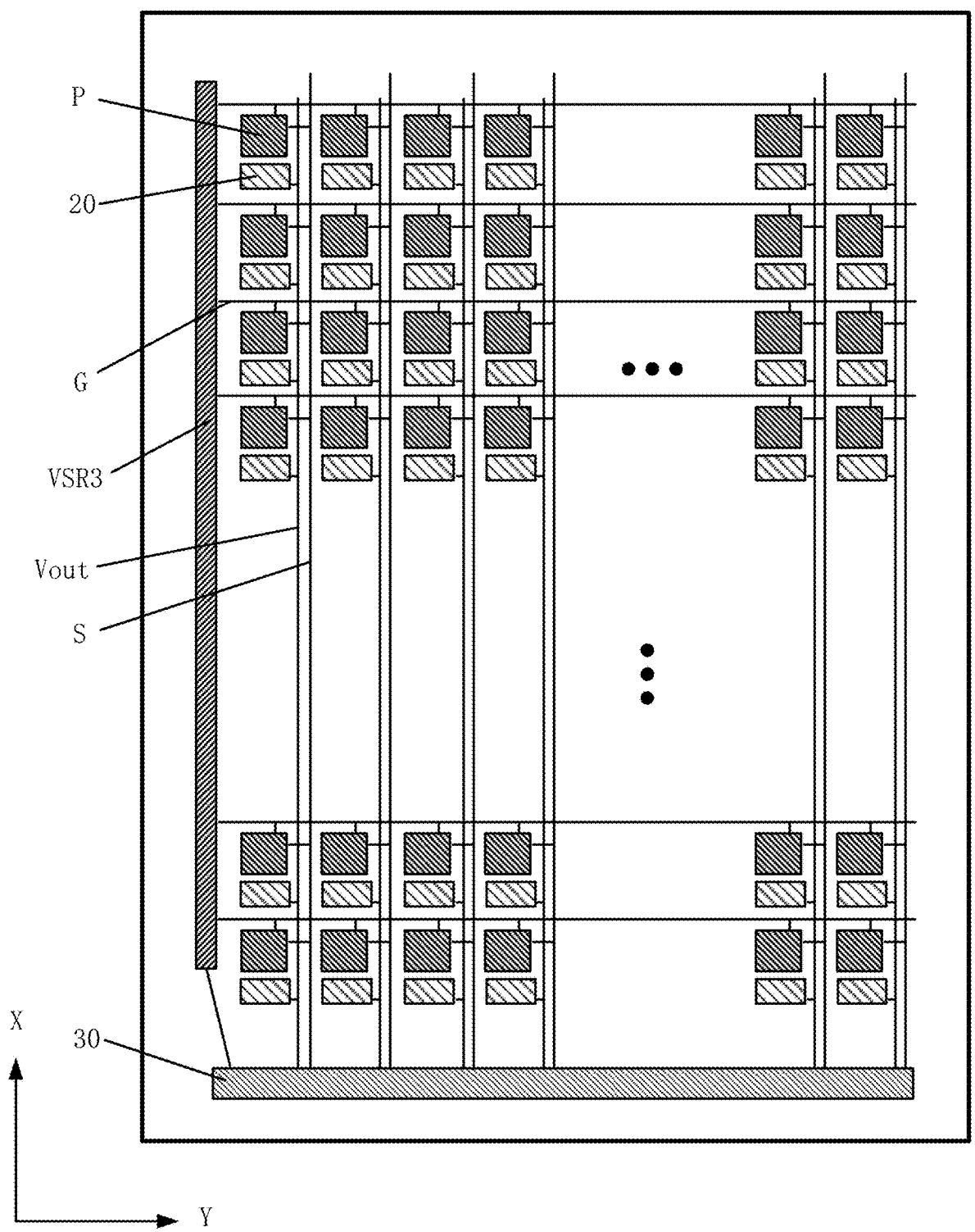
FIG. 6 illustrates another exemplary display panel consistent with various disclosed embodiments in the present disclosure.

Another embodiment of the present disclosure provides another display panel illustrated in FIG. 6. In the embodiment, the display panel may further include a plurality of data lines S, and a plurality of sub-pixels P arranged in an array. Each of the plurality of sub-pixels may be electrically connected to a corresponding one of the plurality of data lines S.

The plurality of data lines S may be electrically connected to the driving circuit 30.

In the present embodiment, the display panel may further include the plurality of data lines S, and the plurality of sub-pixels P arranged in an array. Each of the plurality of sub-pixels may be electrically connected to a corresponding one of the plurality of data lines S. The plurality of data lines S may be electrically connected to the driving circuit 30. The driving circuit 30 may charge each of the plurality of sub-pixels P through the corresponding one of the plurality of data lines S electrically connected to the one of the plurality of sub-pixels P.

For description purposes only, the plurality of touch-control electrodes and the plurality of first signal input lines are not shown in all figures to clearly illustrate major design points of some embodiments of the present disclosure. All display panels provided by various embodiments of the present disclosure may include the plurality of touch-control electrodes and the plurality of first signal input lines.

Figure 7:
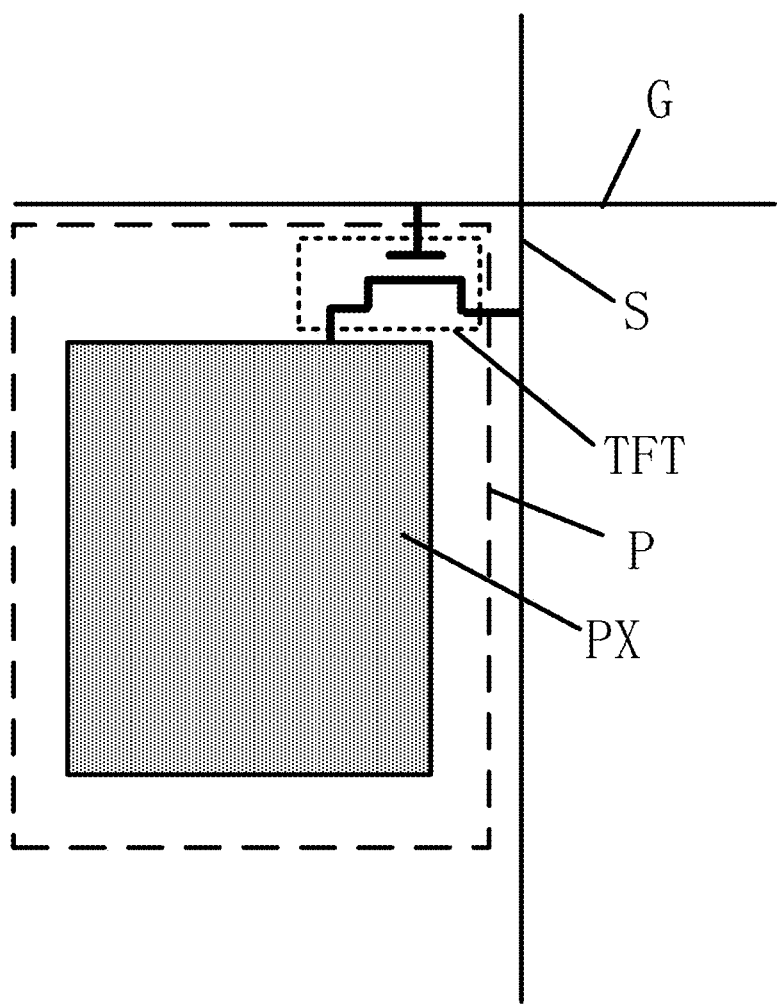
FIG. 7 illustrates an exemplary sub-pixel consistent with various disclosed embodiments in the present disclosure.

FIG. 7 illustrates a sub-pixel consistent with various embodiments of the present disclosure. In one embodiment, as illustrated in FIGS. 6-7, a sub-pixel may include a pixel electrode PX and a thin film transistor TFT. The display panel may further include scanning lines G. For a thin film transistor TFT in a sub-pixel, a gate may be electrically connected to a corresponding scanning line G, a first terminal may be electrically connected to a corresponding one of the plurality of data lines S, and a second terminal may be electrically connected to a pixel electrode PX in the sub-pixel. The thin film transistor TFT may be turned on in response to a control signal from the corresponding scanning line G, to charge the pixel electrode PX through the corresponding one of the data lines S. The pixel electrode PX and a common electrode may have different voltage, to generate an electrical field driving the liquid crystal rotate. Correspondingly, the display panel may display. In some embodiments, the pixel electrode PX may be multiplexed as the common electrode.

As illustrated in FIGS. 5-6, in some embodiments, the plurality of first signal output lines Vout and the plurality of data lines S may extend along a first direction X.

The switch modules 23 disposed in a same line along the first direction X may be electrically connected to a same first signal output line of the plurality of first signal output lines Vout. Sub-pixels of the plurality of sub-pixels P disposed in a same line along the first direction X may be electrically connected to a same data line of the plurality of data lines S.

As illustrated in FIGS. 5-6, the switch modules disposed in a same line along the first direction X may be electrically connected to a same first signal output line of the plurality of first signal output lines Vout, that is, the switch modules 23 disposed in a same line along the first direction X may output signals through a same first signal output line of the plurality of first signal output lines Vout. Sub-pixels of the plurality of sub-pixels P disposed in a same line along the first direction X may be electrically connected to a same data line of the plurality of data lines S, that is, sub-pixels of the plurality of sub-pixels P disposed in a same line along the first direction X may be electrically charged through a same data line of the plurality of data lines S.

As illustrated in FIGS. 5-6, in some embodiments, the display panel may further include a plurality of scanning lines G and a third gate driving circuit VSR3.

Each of the plurality of sub-pixels P may be electrically connected to at least one of the plurality of scanning lines. The plurality of scanning lines G may be electrically connected to the third gate driving circuit VSR3. The third gate driving circuit VSR3 may be electrically connected to the driving circuit 30.

The plurality of scanning lines G may be electrically connected to the driving circuit 30 through the third gate driving circuit VSR3.

In some embodiments, the plurality of scanning lines G may extend along a second direction Y. Sub-pixels of the plurality of sub-pixels P disposed in a same line along the first direction X may be electrically connected to a same data line of the plurality of data lines S. Sub-pixels of the plurality of sub-pixels P disposed in a same line along the second direction Y may be electrically connected to a same scanning line of the plurality of scanning lines G. The first direction X may cross the second direction Y. The plurality of data lines S may extend along the first direction X and may be arranged alternately along the second direction Y. The plurality of scanning lines G may extend along the second direction Y and may be arranged alternately along the first direction X. Each cross between the plurality of scanning lines G and the plurality of data lines S may specify one of the plurality of sub-pixels P.

Figure 8:
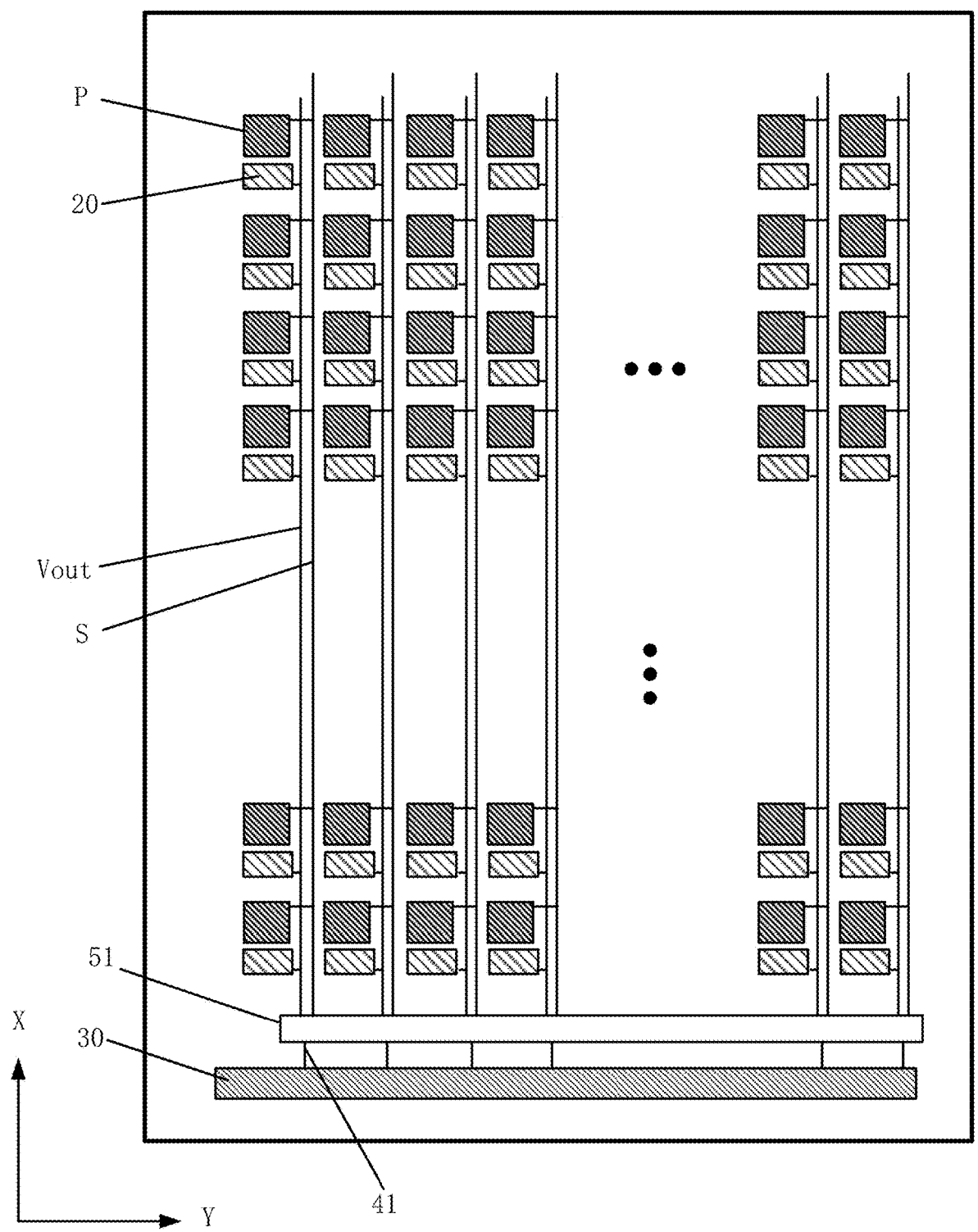
FIG. 8 illustrates another exemplary display panel consistent with various disclosed embodiments in the present disclosure.

Another embodiment of the present disclosure provides another display panel illustrated in FIG. 8. As illustrated in FIG. 8, each of the plurality of fingerprint recognition units 20 may correspond to at least one of the plurality of sub-pixels P. Each of the plurality of fingerprint recognition units 20 may be disposed at a same side of the corresponding at least one of the plurality of sub-pixels P along the first direction X.

As illustrated in FIG. 8, the plurality of data lines S and the plurality of first signal output lines Vout may extend along the first direction X. Each of the plurality of fingerprint recognition units 20 may correspond to at least one of the plurality of sub-pixels P. Each of the plurality of fingerprint recognition units 20 may be disposed at a same side of the corresponding at least one of the plurality of sub-pixels P along the first direction X. Correspondingly, the arrangement of the plurality of fingerprint recognition units 20 may avoid the plurality of data lines S and the plurality of first signal output lines Vout, to alleviate influence of the plurality of data lines S and the plurality of first signal output lines Vout on the identification accuracy of the plurality of fingerprint recognition units 20.

As illustrated in FIG. 3 and FIG. 8, in some embodiments, the display panel may further include a plurality of first connection lines 41, and a first gating unit 51.

Each of the plurality of fingerprint recognition units 20 may correspond to one of the plurality of sub-pixels P.

A first end of the first gating unit 51 may be electrically connected to an end of each one of the plurality of data lines S and an end of each one of the plurality of first signal output lines Vout. A second end of the first gating unit 51 may be electrically connected to a first terminal of each of the plurality of first connecting lines 41. A second end of each of the plurality of first connecting lines 41 may be electrically connected to the driving circuit 30.

A number of the plurality of first connecting lines 41, a number of the plurality of data lines S, and a number of the plurality of first signal output lines Vout may be N1 which is an integer.

In the present embodiment as illustrated in FIG. 8, the display panel may further include the plurality of first connection lines 41, and the first gating unit 51. Each of the plurality of fingerprint recognition units 20 may correspond to one of the plurality of sub-pixels P.

A first end of the first gating unit 51 may be electrically connected to an end of each of the plurality of data lines S and an end of each of the plurality of first signal output lines Vout. A second end of the first gating unit 51 may be electrically connected to a first end of each of the plurality of first connecting lines 41. A second end of each of the plurality of first connecting lines 41 may be electrically connected to the driving circuit 30. The switch modules 23 disposed in a same line along the first direction X may be electrically connected to a same first signal output line of the plurality of first signal output lines Vout. Sub-pixels of the plurality of sub-pixels P disposed in a same line along the first direction X may be electrically connected to a same data line of the plurality of data lines S. The number of the plurality of data lines S may be same as the number of the plurality of first signal output lines Vout. The number of the plurality of first connecting lines 41 may be same as the number of the plurality of data lines S, and the number of the plurality of first signal output lines Vout. The first end of the first gating unit 51 may be electrically connected to the one end of each of the plurality of data lines S and the one end of each of the plurality of first signal output lines Vout. The second end of the first gating unit 51 may be electrically connected to the first end of each of the plurality of first connecting lines 41. The second end of each of the plurality of first connecting lines 41 may be electrically connected to the driving circuit 30. The first gating unit 51 may use a demux technology. Correspondingly, the driving circuit 30 may provide data signals to the plurality of data lines S in a time-sharing manner through fewer first connecting lines 41 and may receive signals output by the plurality of first signal output lines Vout, which may be beneficial to reducing the number of ends 31 in the driving circuit 30 and further reducing the design area of the driving circuit 30. Narrowing the frame of the display panel may be achieved.

Figure 9:
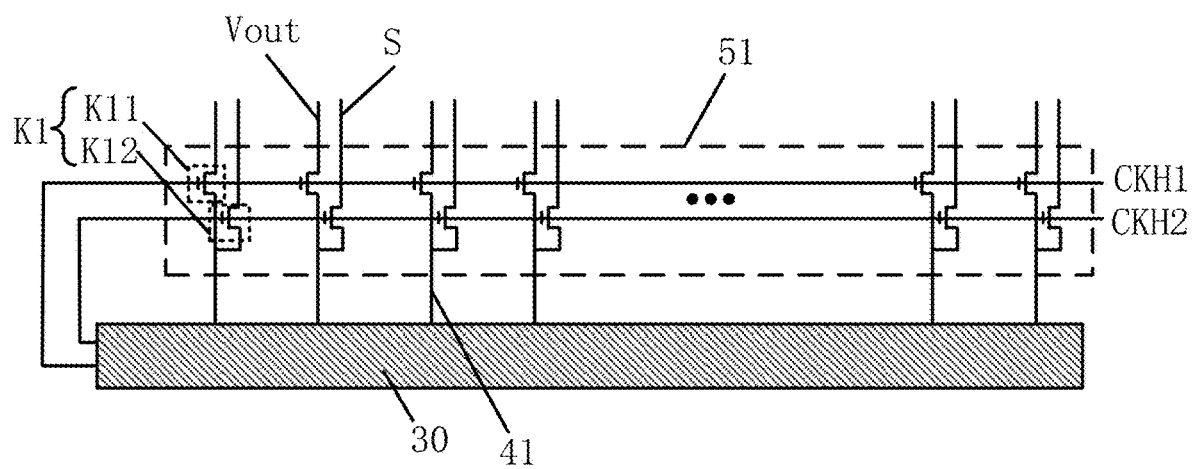
FIG. 9 illustrates an equivalent circuit of an exemplary gating unit consistent with various disclosed embodiments in the present disclosure.

FIG. 9 illustrates a first gating unit provided by an embodiment of the present disclosure. As illustrated in FIGS. 8-9, the first gating unit 51 may include a first switch control line CKH1, a second switch control line CKH2, and N1 first switch groups K1. Each first switch group K1 may include a first switch K11 and a second switch K12.

First terminals of first switches K11 in different first switch groups K1 may be electrically connected to different first signal output lines Vout of the plurality of first signal output lines. Second terminals of first switches K11 in different first switch groups K1 may be electrically connected to different first connecting lines 41 of the plurality of first connecting lines. Control terminals of all first switches K11 may be electrically connected to the first switch control line CKH1.

First terminals of second switches K12 in different first switch groups K1 may be electrically connected to different data lines S of the plurality of data lines. Second terminals of second switches K12 in different first switch groups K1 may be electrically connected to different first connecting lines 41 of the plurality of first connecting lines. Control terminals of all second switches K12 may be electrically connected to the second switch control line CKH2.

As illustrated in FIGS. 8-9, the first switch K11 and the second switch K12 in a first switch group K1 may be turned on in different time by input from the first switch control line CKH1 and the second switch control line CKH2 in different time. When one first switch K11 is turn on, a corresponding first signal output line Vout of the plurality of first signal output line electrically connected to the first switch K11 may output signals to the driving circuit 30 through a corresponding one of the plurality of first connecting lines 41. When one second switch K12 is turn on, the signals may be output to a corresponding data line S of the plurality of data lines electrically connected to the second switch K12 through a corresponding one of the plurality of first connecting lines 41.

Figure 10:
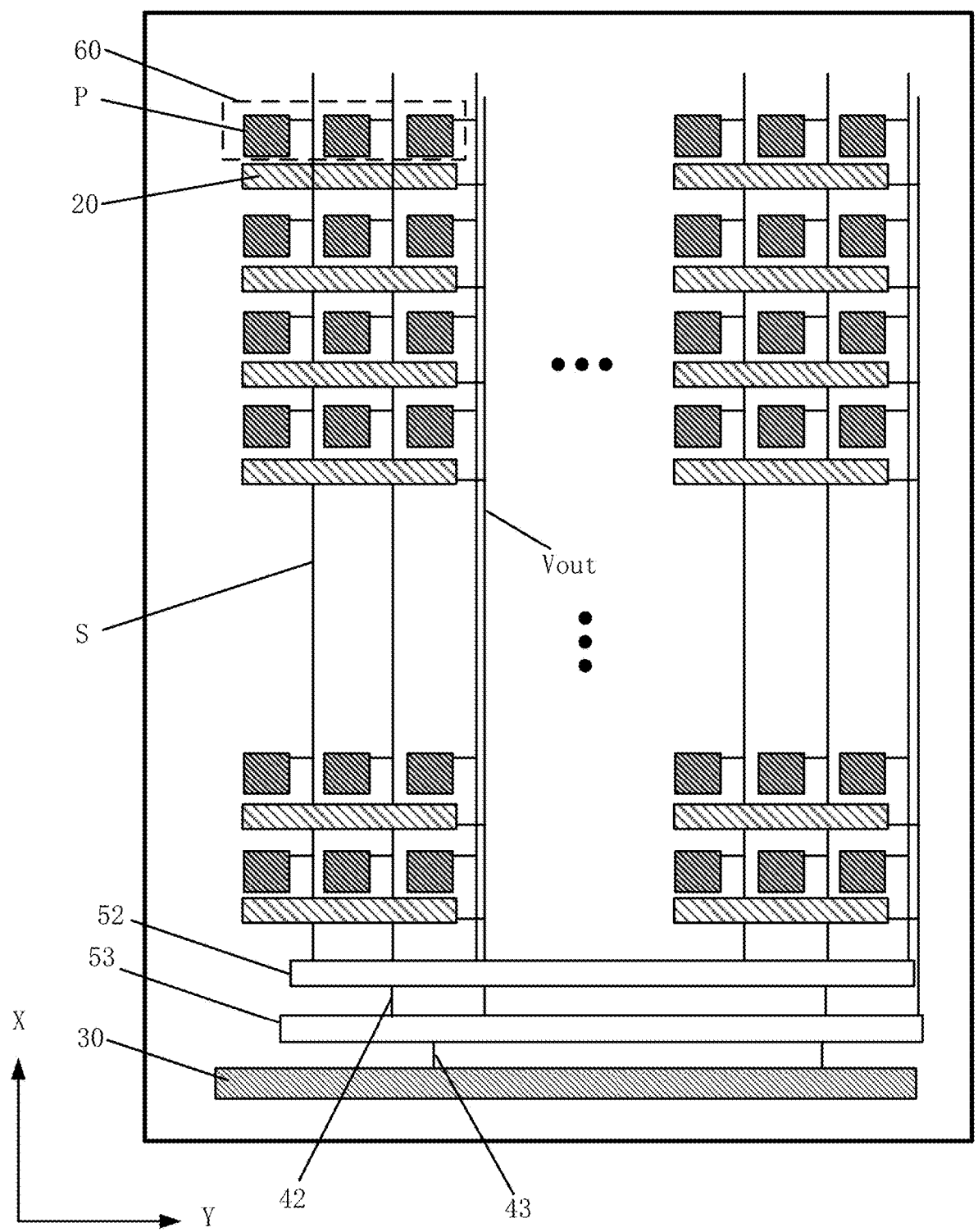
FIG. 10 illustrates another exemplary display panel consistent with various disclosed embodiments in the present disclosure.

Another embodiment of the present disclosure provides another display panel illustrated in FIG. 10. As illustrated in FIG. 10, the display panel may further include a plurality of second connecting lines 42, a plurality of third connecting lines 43, a second gating unit 51, and a third gating unit 53.

Each of the plurality of fingerprint recognition units 20 may correspond to a pixel unit 60. Each pixel unit 60 may include at least two sub-pixels P arranged along the second direction Y. The first direction X may cross the second direction Y.

For the second gating unit 52, a first end may be electrically connected to an end of each of the plurality of data lines S, and a second end may be electrically connected to a first end of each of the second connecting lines 42.

For the third gating unit 53, a first end may be electrically connected to an end of each of the plurality of first signal output lines Vout and a second end of each of the plurality of second connecting lines 42, and a second end may be electrically connected to a first end of each of the plurality of third connecting lines 43. Second ends of the plurality of third connecting lines 43 may be electrically connected to the driving circuit 30.

The number of the plurality of data lines S may be N2. The number of the plurality of second connecting lines 42, the number of the plurality of first signal output lines Vout, and the number of the third connecting lines 43 may be N3. A value of N2/N3 may be same as a number of sub-pixels P in one pixel unit 60. Both N2 and N3 may be integers, and N2/N3 may be also an integer.

In the present embodiment, as illustrated in FIG. 3 and FIG. 10, the display panel may further include the plurality of second connecting lines 42, the plurality of third connecting lines 43, the second gating unit 51, and the third gating unit 53. Each of the plurality of fingerprint recognition units 20 may correspond to a pixel unit 60. Each pixel unit 60 may include at least two sub-pixels P arranged along the second direction Y. The first direction X may cross the second direction Y. For the second gating unit 52, the first end may be electrically connected to the one end of each of the plurality of data lines S, and the second end may be electrically connected to the first end of each of the second connecting lines 42. The number of the plurality of data lines S may be N2, and the number of the plurality of second connecting lines 42 may be N3. The value of N2/N3 may be same as the number of sub-pixels P in one pixel unit 60. For the second gating unit 52, the first end may be electrically connected to the one end of each of the plurality of data lines S, and the second end may be electrically connected to the first end of each of the second connecting lines 42. Correspondingly, the second gating unit 52 may use a multiplexing technology, and may provide data signals to the plurality of data lines S in a time-share manner through a small number of the plurality of second connecting lines 42.

For the third gating unit 53, the first end may be electrically connected to the one end of each of the plurality of first signal output lines Vout and the second end of each of the plurality of second connecting lines 42, and the second end may be electrically connected to the first end of each of the plurality of third connecting lines 43. The second ends of the plurality of third connecting lines 43 may be electrically connected to the driving circuit 30. The number of the plurality of second connecting lines 42, the number of the plurality of first signal output lines Vout, and the number of the third connecting lines 43 may be same. The third gating unit 53 may use a multiplexing technology, and correspondingly the driving circuit 30 may provide data signals to the plurality of second connecting lines 42 and receive signals from the plurality of first signal output lines Vout, through a small number of the plurality of third connecting lines 43 in a time-share manner. The number of the ends 31 in the driving circuit 30 and the design area of the driving circuit 30 may be further reduced. The display panel with a narrower frame may be achieved.

For description purposes only, the embodiment in FIG. 10 with each pixel unit 60 including three sub-pixels where the three sub-pixels are a red sub-pixel, a blue sub-pixel, and a green sub-pixel respectively, is used as an example to illustrate the present disclosure, and should not limit the scopes of the present disclosure. In various embodiments of the present disclosure, each pixel unit 60 may include any suitable number of sub-pixels P.

Figure 11:
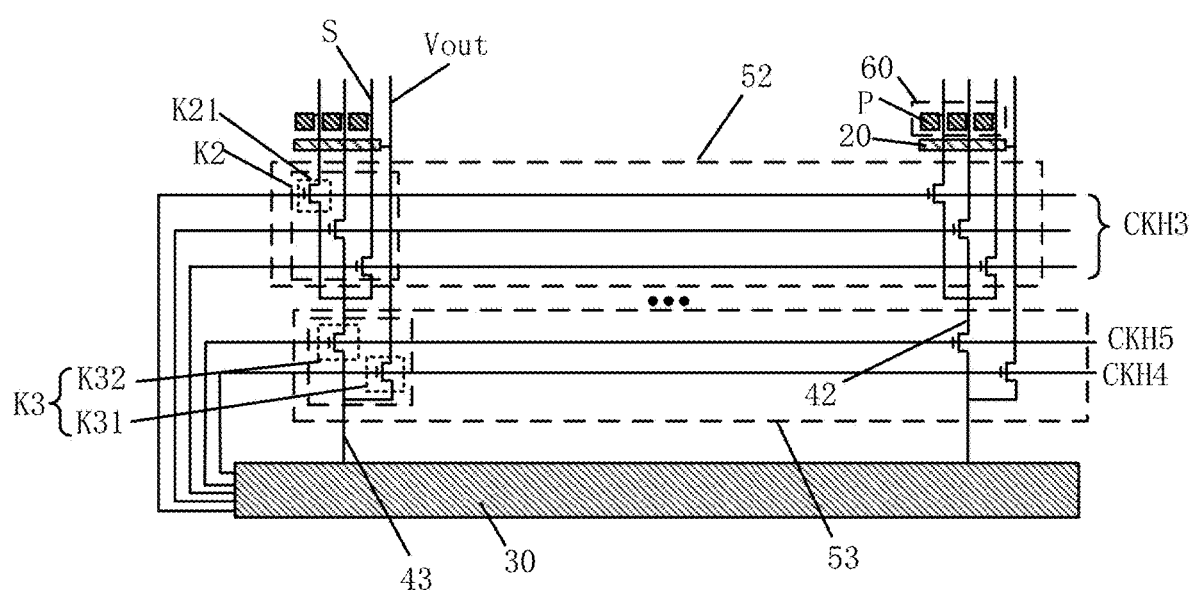
FIG. 11 illustrates a part of another exemplary display panel consistent with various disclosed embodiments in the present disclosure.

Another embodiment of the present disclosure provides another display panel illustrated in FIG. 11. As shown in FIG. 11, the second gating unit 52 may include N2/N3 third switch control lines CKH3, N3 second switch groups K2. Each second switch group K2 may include N2/N3 third switches K21. First terminals of different third switches K21 may be electrically connected to different data lines S of the plurality of data lines. Data lines of the plurality of data lines S electrically connected to a same second switch group K2 may be electrically connected to different sub-pixels P in a corresponding pixel unit 60 respectively. Second terminals of the third switches K21 in different second switch groups K2 may be electrically connected to different second connecting lines 42 of the plurality of second connecting lines 42 respectively. Control terminals of the different third switches K21 in a same second switch group K2 may be electrically connected to different third switch control lines CKH3 respectively.

The third gating unit 53 may include a fourth switch control line CKH4, a fifth switch control line CKH5, and N3 third switch groups K3.

Each third switch group K3 may include a fourth switch K31 and a fifth switch K32.

First terminals of different fourth switches K31 may be electrically connected to different first signal output lines Vout of the plurality of first signal output lines respectively. Second terminals of different fourth switches K31 may be electrically connected to different third connecting lines 43 respectively. Control terminals of the fourth switches K31 may be electrically connected to the fourth switch control lines CKH4.

First terminals of different fifth switches K32 may be electrically connected to different second connecting lines of the plurality of second connecting lines 42 respectively. Second terminals of different fifth switches K32 may be electrically connected to different third connecting lines 43 respectively. Control terminals of the fifth switches K32 may be electrically connected to the fifth switch control lines CKH5.

A fourth switch K31 and a corresponding fifth switch K32 in a same group may be electrically connected to same one of the plurality of third connecting lines 43.

In the present embodiment, as illustrated in FIG. 11, the third gating unit 53 may include the fourth switch control line CKH4, the fifth switch control line CKH5, and the N3 third switch groups K3. Each third switch group K3 may include a fourth switch K31 and a fifth switch K32. The fourth switch K31 and the fifth switch K32 in one third switch group K3 may be turned on in a time-sharing manner by inputting to the fourth switch control line CKH4 and the fifth switch control line CKH5 in a time-sharing manner. When the fourth switch K31 is turn on, a corresponding one of the plurality of first signal output lines Vout electrically connected to the fourth switch K31 may output signal to the driving circuit 30 through corresponding one of the plurality of third connecting lines 43. When the fifth switch K32 is turn on, the data signal may be transmitted to corresponding one of the plurality of second connecting lines 42 electrically connected to the fifth switch K32 through corresponding one of the plurality of third connecting lines 43.

The second gating unit 52 may include the N2/N3 third switch control lines CKH3, and the N3 second switch groups K2. Each second switch group K2 may include the N2/N3 third switches K21. By inputting to different third switch control lines CKH3 in a time-sharing manner, the third switches K21 in one second switch group K2 may be turned on in a time-sharing manner, and the data signals may be transmitted from the plurality of second connecting lines 42 to different data lines of the plurality of data lines S through the third switches K21 which are turn on in a time-sharing manner.

Figure 12:
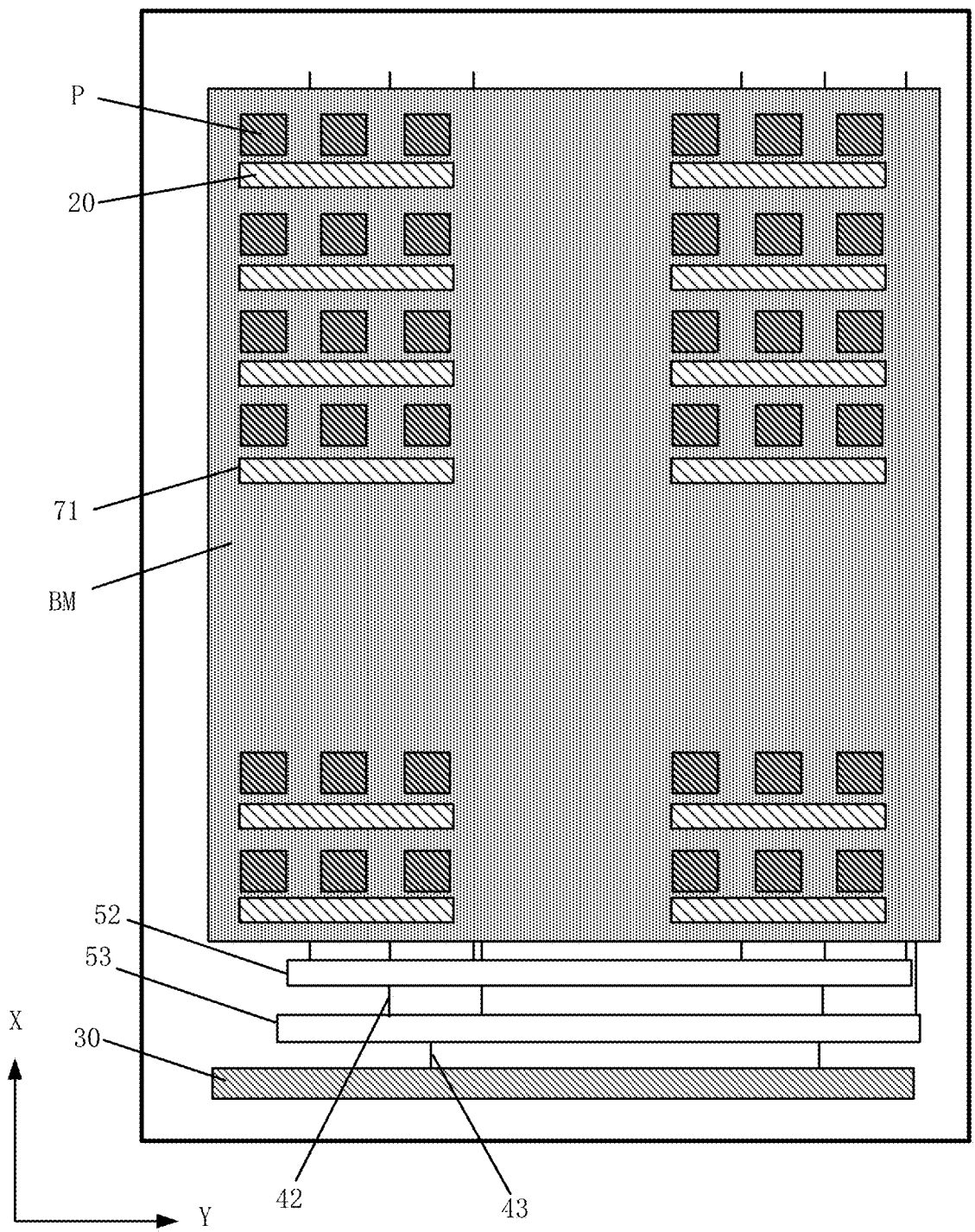
FIG. 12 illustrates another exemplary display panel consistent with various disclosed embodiments in the present disclosure.

Another embodiment of the present disclosure provides another display panel shown in FIG. 12. As illustrated in FIG. 2 and FIG. 12, the display panel may further include a black matrix BM. First opening 71 may be disposed in the black matrix BM.

A vertical projection of one photodiode 21 to a plane of the black matrix BM may be located in an area of a corresponding first opening 71.

In the present embodiment illustrated in FIG. 12, the display panel may further include the black matrix BM. The black matrix BM may be cover regions of data lines, scanning lines, or switch units made of opaque metals. First opening 71 may be disposed in the black matrix BM. A vertical projection of one photodiode 21 to a plane of the black matrix BM may be located in an area of a corresponding first opening 71. Influence on the accuracy of the photodiodes 21 due to coverage of the photodiodes 21 by the black matrix BM may be avoided.

In some embodiments, the display panel may include a plurality of color blockers. The plurality of color blockers may be disposed in openings of the black matrix. Each of the plurality of color blockers may correspond to a transparent region of a corresponding sub-pixels.

The present closure also provides a driving method for a display panel. The display panel may include a plurality of first signal output lines Vout, a plurality of first signal input lines 10, a plurality of fingerprint recognition units 20 arranged in an array, a plurality of touch-control electrodes SX arranged in an array, and a driving circuit 30. Each of the plurality of touch-control electrodes SX may correspond to at least two of the plurality of fingerprint recognition units 20.

Each of the plurality of touch-control electrodes SX may be electrically connected to at least one of the plurality of first signal input lines 10.

Each fingerprint recognition unit 20 of the plurality of fingerprint recognition units 20 may include a photodiode 21, a first electrode 22, and a switch module 23. A first terminal of the photodiode 21 may be electrically connected to the switch module 23, and a second terminal of the photodiode 21 may be electrically connected to a corresponding touch-control electrode SX. Each switch module 23 may be electrically connected to a corresponding first signal output line Vout of the plurality of first signal output lines Vout. The first electrode 22 may be electrically connected to the first electrode of the photodiode 21.

The plurality of first signal output lines Vout and the plurality of first signal input line 10 may be electrically connected to the driving circuit 30.

The driving method for the display panel may include:

in a touch-control stage, the driving circuit 30 may control the plurality of first signal input lines 10 to input touch-control signals, and the plurality of first signal output lines Vout to output touch-control position information; and in a fingerprint recognition stage, the driving circuit 30 may control the plurality of first signal input lines 10 to input bias voltage signals, and the plurality of first signal output lines Vout to output fingerprint information.

In the present disclosure, as illustrated in FIGS. 1-2, the display panel may include the plurality of fingerprint recognition units 20 arranged in an array and the plurality of touch-control electrodes SX arranged in an array. Each of the plurality of touch-control electrodes SX may correspond to at least two of the plurality of fingerprint recognition units 20. Each of the plurality of touch-control electrodes SX may be electrically connected to one of the plurality of first signal input lines 10. Each fingerprint recognition unit 20 of the plurality of fingerprint recognition units 20 may include a photodiode 21, a first electrode 22, and a switch module 23. A first terminal of the photodiode 21 may be electrically connected to the switch module 23, and a second terminal of the photodiode 21 may be electrically connected to a corresponding touch-control electrode SX. Each switch module 23 may be electrically connected a corresponding first signal output line Vout of the plurality of first signal output lines Vout. The first electrode 22 may be electrically connected to the first electrode of the photodiode 21. In each of the plurality of fingerprint recognition units 20, the first electrode 22 and the corresponding touch-control electrode SX may form a memory capacitance Cst illustrated in FIG. 2. A first electrode of the memory capacitance Cst electrically connected to the photodiode 21 may be the first electrode 22, and the corresponding touch-control electrode SX may be multiplexed as another electrode of the memory capacitance. The plurality of first signal output lines Vout and the plurality of first signal input line 10 may be electrically connected to the driving circuit 30.

In the touch-control stage, the driving circuit 30 may control the plurality of a first signal input lines 10 to input touch-control signal. In each of the plurality of fingerprint recognition units, a voltage of the second terminal of the photodiode 21 may be a voltage of the touch-control signal. When a finger touches the display panel, light may be reflected when the light arrives at the fingerprint of the finger and the reflective light may project at the photodiode 21 to induce a change of resistance of the photodiode 21. Correspondingly, charges may be generated to form a photoinductive current, and the photoinductive current may pass through the switch module 23 to generate a voltage signal.

When no finger touches the display panel, the light may not be reflected to the photodiode 21. For one fingerprint recognition unit 20 of the plurality of fingerprint recognition units, a corresponding first signal output line Vout of the plurality of first signal output lines electrically connected to the fingerprint recognition unit 20 may output different voltage signals when the fingerprint recognition unit 20 is or is not in contact with the finger. Correspondingly, according to variation of the output voltage signal in one first signal output line Vout of the plurality of first signal output lines, it can be determined whether a fingerprint recognition unit 20 of the plurality of fingerprint recognition units electrically connected to the first signal output line is touched. A corresponding touch position may be obtained and the plurality of first signal output lines Vout may output touch position information.

In a fingerprint recognition stage, the driving circuit 30 may control the plurality of first signal input lines 10 to input a bias voltage signal. When a finger touches the screen, the light may be reflected when it strikes valley lines and ridge lines of a fingerprint of the finger. Because of different reflection angles and different intensity of the reflected light for the valley lines and ridge lines, the light may be projected onto photodiodes 21 of the plurality of fingerprint recognition units 20, causing a change of the resistance of the photodiodes 21. Correspondingly, charges may be generated to form photoinductive currents. The photoinductive currents may pass through switch modules 23 of the plurality of fingerprint recognition units and generate voltage signals. At this time, the plurality of first signal output lines Vout may output fingerprint information.

Each of the plurality of touch-control electrodes SX and corresponding one of the plurality of fingerprint recognition units 20 may share a same first signal input line 10 and a same first signal output line Vout. A number of lines in the display panel, difficulty of wiring in the display panel, and crosstalk between lines may be effectively reduced. A signal-to-noise ratio of each of the plurality of fingerprint recognition units may be improved. Further, a number of lines electrically connected to the driving circuit 30 may be effectively reduced.

As illustrated in FIG. 3 showing a schematic structural diagram of a driving circuit provided by the present disclosure. The driving circuit 30 may be electrically connected to lines through terminals 31. When the number of lines is reduced, a number of terminals 31 in the driving circuit 30 may also be reduced, facilitating a reduction of the design area of the driving circuit 30 and achieving a narrower frame of the display panel.

As illustrated in FIG. 4, the display panel may further include a plurality of first control signal lines Rst, a plurality of second control signal lines Set, a plurality of first gate driving circuits VSR1, and a plurality of second gate driving circuits VSR2.

The plurality of first gate driving circuits VSR1, and the plurality of second gate driving circuits VSR2 may be electrically connected to the driving circuit 30.

Fingerprint recognition units 20 of the plurality of fingerprint recognition units connected to a same touch-control electrode of the plurality of touch-control electrodes SX may be connected to a same first gate driving circuit of the plurality of first gate driving circuits VSR1 through the plurality of first control signal lines Rst.

Fingerprint recognition units 20 of the plurality of fingerprint recognition units connected to a same touch-control electrode of the plurality of touch-control electrodes SX may be connected to a same second gate driving circuit of the plurality of second gate driving circuits VSR2 through the plurality of second control signal lines Set.

In the present disclosure, the display panel may further include the plurality of first gate driving circuits VSR1 and the plurality of second gate driving circuits VSR2 electrically connected to the driving circuit 30. Fingerprint recognition units 20 of the plurality of fingerprint recognition units connected to a same touch-control electrode of the plurality of touch-control electrodes SX may be connected to a same first gate driving circuit of the plurality of first gate driving circuits VSR1 through the plurality of first control signal lines Rst. Fingerprint recognition units 20 of the plurality of fingerprint recognition units connected to a same touch-control electrode of the plurality of touch-control electrodes SX may be connected to a same second gate driving circuit of the plurality of second gate driving circuits VSR2 through the plurality of second control signal lines Set. In the touch-control stage, the driving circuit 30 may determine touch-control area based on the touch-control position information. In the fingerprint recognition phase, based on the touch-control area the driving circuit 30 may provide driving signals to a portion of the plurality of first gate driving circuits VSR1 and a portion of the plurality of second gate driving circuits VSR2 electrically connected to a portion of the plurality of fingerprint recognition units 20 located in the touch-control area. The portion of the plurality of first gate driving circuit VSR1 and the portion of the plurality of second gate driving circuit VSR2 may provide driving signals to the portion of the plurality of fingerprint recognition units 20 in the touch-control area. It may not be necessary to drive all of the plurality of first gate driving circuits VSR1 and all of the plurality of second gate driving circuits VSR2 in the fingerprint recognition state to provide the driving signals to all of the plurality of the fingerprint recognition units 20. The driving capability of the display panel may be improved, and the power consumption may be reduced.

Figure 13:
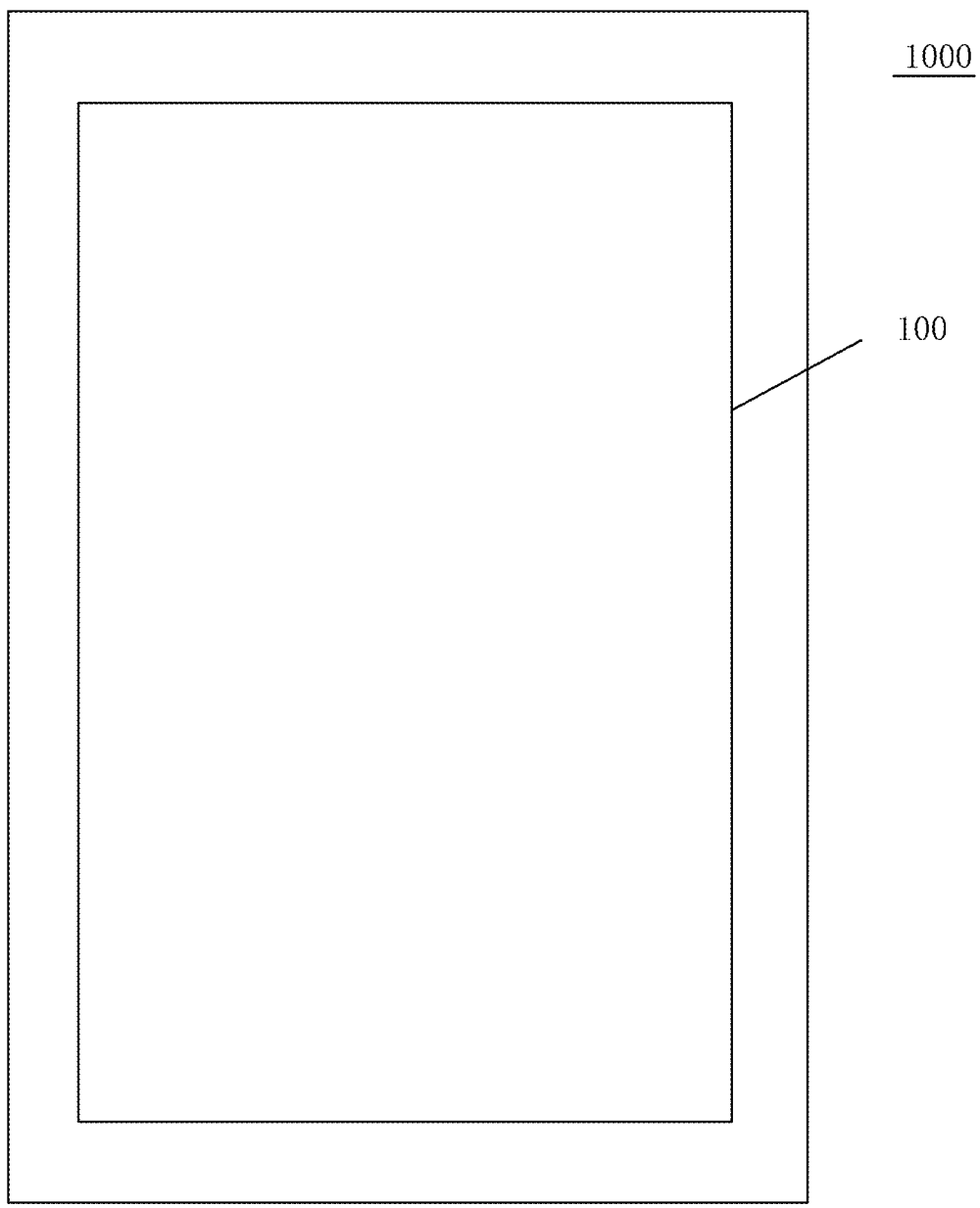
FIG. 13 illustrates an exemplary display device consistent with various disclosed embodiments in the present disclosure.

The present disclosure also provides a display device illustrated in FIG. 13. As illustrated in FIG. 13, the display device 1000 may include a display panel 100. The display panel 100 may be any one of the display panels provided by various embodiments of the present disclosure. For description purposes only, the embodiment in FIG. 13 where the display device is a cell phone is used as an example to illustrate the present disclosure, and should not limit the scopes of the present disclosure. In various embodiments of the present disclosure, the display device may be any suitable display device with display function including a computer, a television, a vehicle display device. The present disclosure has no limit on this.

In the present disclosure, the display panel may include the plurality of fingerprint recognition units arranged in an array and the plurality of touch-control electrodes arranged in an array. Each of the plurality of touch-control electrodes may correspond to at least two of the plurality of fingerprint recognition units. Each of the plurality of touch-control electrodes may be electrically connected to one of the plurality of first signal input lines. Each of the plurality of fingerprint recognition units may include a photodiode, a first electrode, and a switch module. A first terminal of the photodiode may be electrically connected to the switch module, and a second terminal of the photodiode may be electrically connected to a corresponding one of the plurality of touch-control electrodes. Each switch module may be electrically connected a corresponding one of the plurality of first signal output lines. The first electrode may be electrically connected to the first terminal of the photodiode. In each of the plurality of fingerprint recognition units, the first electrode and the corresponding one of the plurality of touch-control electrodes may form a memory capacitance. A first terminal of the memory capacitance electrically connected to the photodiode may be the first electrode, and the corresponding touch-control electrode may be multiplexed as another electrode of the memory capacitance. The plurality of first signal output lines and the plurality of first signal input line may be electrically connected to the driving circuit. In the touch-control stage, the driving circuit may control the plurality of first signal input lines to input touch-control signals. In each of the plurality of fingerprint recognition units, a voltage of the second terminal of the photodiode may be a voltage of the touch-control signals. When a finger touches the display panel, light may be reflected when the light arrives at the fingerprint of the finger and the reflective light may project at the photodiode to induce a change of resistance of the photodiode. Correspondingly, charges may be generated to form a photoinductive current, and the photoinductive current may pass through the switch module to generate a voltage signal. When no finger touches the display panel, the light may not be reflected to the photodiode. For one of the plurality of fingerprint recognition units, a corresponding one of the plurality of first signal output lines electrically connected to the fingerprint recognition unit may output different voltage signals when the fingerprint recognition unit is or is not in contact with the finger. Correspondingly, according to variation of the output voltage signal in one first signal output line of the plurality of first signal output lines, it can be determined whether a fingerprint recognition unit of the plurality of fingerprint recognition units electrically connected to the first signal output line is touched. A corresponding touch position may be obtained and the plurality of first signal output lines may output touch position information. In a fingerprint recognition stage, the driving circuit may control the plurality of first signal input lines to input a bias voltage signal. When a finger touches the screen, the light may be reflected when it strikes valley lines and ridge lines of a fingerprint of the finger. Because of different reflection angles and different intensity of the reflected light for the valley lines and ridge lines, the light may be projected onto the photodiodes of the plurality of fingerprint recognition units, causing a change of the resistance of the photodiodes. Correspondingly, charges may be generated to form photoinductive currents. The photoinductive currents may pass through switch modules of the plurality of fingerprint recognition units and generate voltage signals. At this time, the plurality of first signal output lines may output fingerprint information. Each of the plurality of touch-control electrodes and the corresponding one of the plurality of fingerprint recognition units may share a same first signal input line and a same first signal output line. A number of lines in the display panel, difficulty of wiring in the display panel, and crosstalk between lines may be effectively reduced. A signal-to-noise ratio of each of the plurality of fingerprint recognition units may be improved. Further, a number of lines electrically connected to the driving circuit 30 may be effectively reduced. The driving circuit may be electrically connected to lines through terminals. When the number of lines is reduced, a number of terminals in the driving circuit 30 may also be reduced, facilitating the reduction of the design area of the driving circuit 30 and achieving a narrower frame of the display panel.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A display panel, comprising:
a plurality of first signal output lines;
a plurality of first signal input lines;
a plurality of fingerprint recognition units arranged in an array;
a plurality of touch-control electrodes arranged in an array; and
a driving circuit,
wherein:
one touch-control electrode of the plurality of touch-control electrodes at least corresponds to two fingerprint recognition units of the plurality of fingerprint recognition units;
the one touch-control electrode of the plurality of touch-control electrodes and the corresponding at least two fingerprint recognition units of the plurality of fingerprint recognition units share a same first signal input line of the plurality of first signal input lines and a same first signal output line of the plurality of first signal output lines;
one touch-control electrode of the plurality of touch-control electrodes is electrically connected to at least one first signal input line of the plurality of first signal input lines;
a fingerprint recognition unit of the plurality of fingerprint recognition units includes a photodiode, a first electrode, and a switch module;
for each of the plurality of fingerprint recognition units, a first terminal of the photodiode is electrically connected to the switch module, a second terminal of the photodiode is electrically connected to a corresponding one of the plurality of touch-control electrodes, the switch module is electrically connected to a corresponding one of the plurality of first signal output lines, and the first electrode is electrically connected to the first terminal of the photodiode; and
the plurality of first signal output lines and the plurality of first signal input lines are electrically connected to the driving circuit.

2. The display panel according to claim 1, wherein:
a first signal input line of the plurality of first signal input lines has an end electrically connected to the driving circuit, and has another end electrically connected to a corresponding touch-control electrode of the plurality of touch-control electrodes through a through hole.

3. The display panel according to claim 1, further including a plurality of first control signal lines, a plurality of second control signal lines, a plurality of first gate driving circuits, and a plurality of second gate driving circuits, wherein:
the plurality of first gate driving circuits and the plurality of second gate driving circuits are all electrically connected to the driving circuit;
fingerprint recognition units that are electrically connected to a same touch-control electrode are electrically connected to a same first gate driving circuit through one or more first control signal lines of the plurality of first control signal lines; and
fingerprint recognition units that are electrically connected to a same touch-control electrode are electrically connected to a same second gate driving circuit through one or more second control signal lines of the plurality of second control signal lines.

4. The display panel according to claim 3, wherein in the fingerprint recognition unit:
the switch module includes a first transistor, a second transistor, and a third transistor;
for the first transistor, a gate is electrically connected to a corresponding first control signal line, a first terminal is electrically connected to the first terminal of the photodiode, and a second terminal is electrically connected to a first voltage signal terminal;
for the second transistor, a gate is electrically connected to the first terminal of the photodiode, a first terminal is electrically connected to a first terminal of the third transistor, and a second terminal is electrically connected to the first voltage signal terminal; and
for the third transistor, a gate is electrically connected to a corresponding second control signal line, and a second terminal is electrically connected to a corresponding first signal output line.

5. The display panel according to claim 4, further including a plurality of data lines and a plurality of sub-pixels arranged in an array, wherein each of the plurality of sub-pixels is electrically connected to one of the plurality of data lines and the plurality of data lines is electrically connected to the driving circuit.

6. The display panel according to claim 5, wherein:
the plurality of first signal output lines and the plurality of data lines all extend along a first direction;
switch modules arranged in a same line along the first direction are electrically connected to a same first signal output line of the plurality of first signal output lines; and
sub-pixels of the plurality of sub-pixels arranged in a same line along the first direction are electrically connected to a same data line of the plurality of data lines.

7. The display panel according to claim 6, wherein:
one fingerprint recognition unit of the plurality of fingerprint recognition units corresponds to at least one sub-pixel of the plurality of sub-pixels, and
the fingerprint recognition unit is disposed at a same side of the at least one sub-pixel along the first direction.

8. The display panel according to claim 7, further including a plurality of first connecting lines and a first gating unit, wherein:
one fingerprint recognition unit of the plurality of fingerprint recognition units corresponds to one sub-pixel of the plurality of sub-pixels;
for the first gating unit, a first end is electrically connected to an end of each of the plurality of data lines and an end of each of the plurality of first signal output lines, and a second end is electrically connected to a first end of each of the plurality of first connecting lines;
a second end of each of the plurality of first connecting lines is electrically connected to the driving circuit; and
a number of the plurality of first connecting lines, a number of the plurality of data lines, and a number of the plurality of first signal output lines are all N1, wherein N1 is a positive integer.

9. The display panel according to claim 8, wherein:
the first gating unit includes a first switch control line, a second switch control line, and N1 first switch groups;

each of the N1 first switch groups includes a first switch and a second switch;

for first switches in different groups, first terminals are electrically connected to different first signal output lines of the plurality of first signal output lines, and second terminals are electrically connected to different first connecting lines of the plurality of first connecting lines;

control terminals of all first switches are electrically connected to the first switch control line;

for second switches in different groups, first terminals are electrically connected to different data lines of the plurality of data lines, and second terminals are electrically connected to different first connecting lines of the plurality of first connecting lines;

control terminals of all second switches are electrically connected to the second switch control line; and a first switch and a second switch in a same group are electrically connected to a same first connecting line of the plurality of first connecting lines.

10. The display panel according to claim 7, further including a plurality of second connecting lines, a plurality of third connecting lines, a second gating unit, and a third gating unit, wherein:

one fingerprint recognition unit corresponds to a pixel unit, wherein one pixel unit includes at least two of the plurality of sub-pixels arranged along a second direction and the second direction intersects the first direction;

for the second gating unit, a first end is electrically connected to an end of each of the plurality of data lines, and a second end is electrically connected to a first end of each of the plurality of second connecting lines;

for the third gating unit, a first end is electrically connected to an end of each of the plurality of first signal output lines and a second end of each of the plurality of second connecting lines, a second end is electrically connected to a first terminal of each of the plurality of third connecting lines;

a second end of each of the plurality of third connecting lines is electrically connected to the driving circuit;

a number of the plurality of data lines is N2; and a number of the plurality of second connecting lines, a number of the plurality of first signal output lines, and a number of the plurality of third connecting lines are N3, wherein a value of N2/N3 equals a number of sub-pixels in each pixel unit, N2 and N3 are positive integers, and N2/N3 is a positive integer.

11. The display panel according to claim 10, wherein:

the second gating unit includes N2/N3 third switch control lines and N3 second switch groups;

each of the N3 second switch groups includes N2/N3 third switch;

first terminals of different third switches are electrically connected to different data lines of the plurality of data lines;

data lines that are electrically connected to a same second switch group are electrically connected to different sub-pixels in a corresponding pixel unit respectively;

second terminals of third switches in different groups are electrically connected to different second connecting lines of the plurality of second connecting lines;

second terminals of third switches in a same group are electrically connected to a same one of the plurality of second connecting lines;

control terminals of the third switches in a same group are electrically connected to different third switch control lines respectively;

the third gating unit includes a fourth switch control line, a fifth switch control line, and N3 third switch groups;

each of the third switch groups includes a fourth switch and a fifth switch;

first terminals of different fourth switches are electrically connected to different first signal output lines of the plurality of first signal output lines, second terminals of different fourth switches are electrically connected to different third connecting lines of the plurality of third connecting lines, and control terminal of the fourth switches are electrically connected to the fourth switch control lines;

first terminals of different fifth switches are electrically connected to different second connecting lines of the plurality of second connecting lines, second terminals of different fourth switches are electrically connected to different third connecting lines of the plurality of third connecting lines, and control terminal of the fifth switches are electrically connected to the fifth switch control lines; and a fourth switch and a fifth switch in a same group are electrically connected to a same one of the plurality of third connecting lines.

12. The display panel according to claim 5, further including a black matrix, wherein:

first openings are formed in the black matrix; and a vertical projection of the photodiode of one of the plurality of fingerprint recognition units to a plane of the black matrix is located in an area of a corresponding first opening.

13. The display panel according to claim 5, further including a plurality of scanning lines and a third gate driving circuit, wherein:

each of the plurality of sub-pixels is electrically connected to at least one of the plurality of scanning lines;

the plurality of scanning lines is electrically connected to the third gate driving circuit; and the third gate driving circuit is electrically connected to the driving circuit.

14. A driving method for a display panel, the display panel comprising a plurality of first signal output lines, a plurality of first signal input lines, a plurality of fingerprint recognition units arranged in an array, a plurality of touch-control electrodes arranged in an array, and a driving circuit, wherein:

one touch-control electrode of the plurality of touch-control electrodes at least corresponds to two fingerprint recognition units of the plurality of fingerprint recognition units;

one touch-control electrode of the plurality of touch-control electrodes is electrically connected to at least one first signal input line of the plurality of first signal input lines;

a fingerprint recognition unit of the plurality of fingerprint recognition units includes a photodiode, a first electrode, and a switch module;

for the fingerprint recognition unit, a first terminal of the photodiode is electrically connected to the switch module, a second terminal of the photodiode is electrically connected to a corresponding one of the plurality of touch-control electrodes, the switch module is electrically connected to a corresponding one of the plurality of first signal output lines, and the first electrode is electrically connected to the first terminal of the photodiode; and the plurality of first signal output lines and the plurality of first signal input lines are electrically connected to the driving circuit;

the driving method comprising:

in a touch-control stage, the driving circuit controlling the plurality of first signal input lines to input touch-control driving signals, and controlling the plurality of first signal output lines to output touch-control position information; and in a fingerprint recognition stage, the driving circuit controlling the plurality of first signal input lines to input bias voltage signals, and controlling the plurality of first signal output lines to output fingerprint information.

15. The driving method according to claim 14, wherein:

the display panel further includes a plurality of first control signal lines, a plurality of second control signal lines, a plurality of first gate driving circuits, and a plurality of second gate driving circuits, wherein:

the plurality of first gate driving circuits and the plurality of second gate driving circuits are electrically connected to the driving circuit;

fingerprint recognition units of the plurality of fingerprint recognition units electrically connected to a same one of the touch-control electrodes are electrically connected to a same one of the plurality of first gate driving circuits through the plurality of first control signal lines; and fingerprint recognition units of the plurality of fingerprint recognition units electrically connected to a same one of the touch-control electrodes are electrically connected to a same one of the plurality of second gate driving circuits through the plurality of second control signal lines;

in the touch-control stage, the driving circuit determines touch-control areas according to the touch-control position information; and in the fingerprint recognition stage, the driving circuit provides driving signals to the plurality of first gate driving circuits and the plurality of second gate driving circuits according to the touch-control areas, to make the plurality of first gate driving circuits and the plurality of second gate driving circuits provide driving signals to fingerprint recognition units of the plurality of fingerprint recognition units in the touch-control area.

16. A display device including a display panel, wherein:

the display panel comprising a plurality of first signal output lines, a plurality of first signal input lines, a plurality of fingerprint recognition units arranged in an array, a plurality of touch-control electrodes arranged in an array, and a driving circuit, wherein:

one of the plurality of touch-control electrodes corresponds to at least two of the plurality of fingerprint recognition units;

the one of the plurality of touch-control electrodes and the corresponding at least two fingerprint recognition units share a same first signal input line of the plurality of first signal input lines and a same first signal output line of the plurality of first signal output lines;

one of the plurality of touch-control electrodes is electrically connected to at least one of the plurality of first signal input lines;

a fingerprint recognition unit of the plurality of fingerprint recognition units includes a photodiode, a first electrode, and a switch module;

for fingerprint recognition unit, a first terminal of the photodiode is electrically connected to the switch module, a second terminal of the photodiode is electrically connected to a corresponding one of the plurality of touch-control electrodes, the switch module is electrically connected to a corresponding one of the plurality of first signal output lines, and the first electrode is electrically connected to the first terminal of the photodiode; and the plurality of first signal output lines and the plurality of first signal input lines are electrically connected to the driving circuit.

17. The display device according to claim 16, wherein:

a first signal input line of the plurality of first signal input lines has an end electrically connected to the driving circuit, and has another end electrically connected to a corresponding touch-control electrode of the plurality of touch-control electrodes through a through hole.

18. The display device according to claim 16, wherein the display panel further includes a plurality of first control signal lines, a plurality of second control signal lines, a plurality of first gate driving circuits, and a plurality of second gate driving circuits, wherein:

the plurality of first gate driving circuits and the plurality of second gate driving circuits are all electrically connected to the driving circuit;

fingerprint recognition units that are electrically connected to a same touch-control electrode are electrically connected to a same first gate driving circuit through one or more first control signal lines of the plurality of first control signal lines; and fingerprint recognition units that are electrically connected to a same touch-control electrode are electrically connected to a same second gate driving circuit through one or more second control signal lines of the plurality of second control signal lines.

19. The display device according to claim 18, wherein in the fingerprint recognition unit:

the switch module includes a first transistor, a second transistor, and a third transistor;

for the first transistor, a gate is electrically connected to a corresponding first control signal line, a first terminal is electrically connected to the first terminal of the photodiode, and a second terminal is electrically connected to a first voltage signal terminal;

for the second transistor, a gate is electrically connected to the first terminal of the photodiode, a first terminal is electrically connected to a first terminal of the third transistor, and a second terminal is electrically connected to the first voltage signal terminal; and for the third transistor, a gate is electrically connected to a corresponding second control signal line, and a second terminal is electrically connected to a corresponding first signal output line.

20. The display device according to claim 19, wherein the display panel further includes a plurality of data lines and a plurality of sub-pixels arranged in an array, wherein each of the plurality of sub-pixels is electrically connected to one of the plurality of data lines and the plurality of data lines is electrically connected to the driving circuit.

* * * * *